Jan. 20, 1931.                T. M. RECTOR                1,789,946
                          METHOD OF PACKING NUTS
                            Filed Aug. 31, 1929
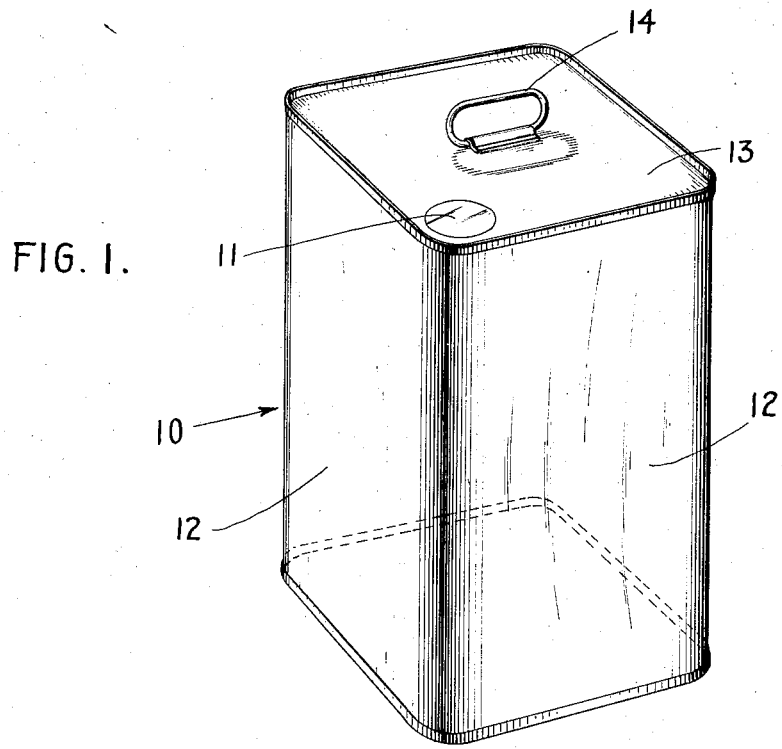
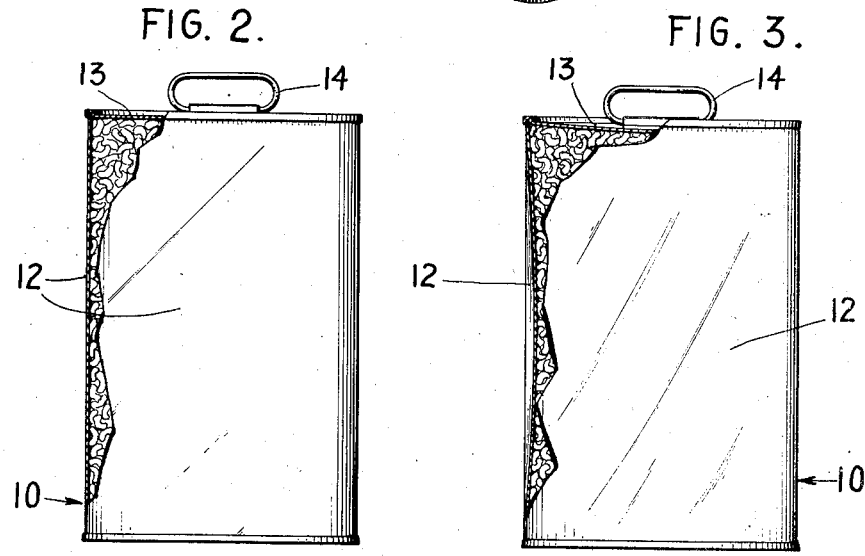

Patented Jan. 20, 1931

1,789,946

UNITED STATES PATENT OFFICE

THOMAS M. RECTOR, OF RUTHERFORD, NEW JERSEY, ASSIGNOR TO FRANKLIN BAKER COMPANY, OF NEW YORK, N. Y., A CORPORATION OF NEW JERSEY

METHOD OF PACKING NUTS

Application filed August 31, 1929. Serial No. 389,695.

This invention relates to a process for packing shelled nuts for shipment and is particularly adapted to packing shelled cashew nuts in India for export shipment.

The invention provides an economical method of preserving the nuts against spoilage and deterioration, as well as against the breakage that is likely to result from handling and shipping.

The present application is in part a continuation of application Serial No. 755,642 filed on December 13, 1924, which has resulted in Patent No. 1,726,766.

While preferred forms of the invention are disclosed herein, it will be understood that various changes may be made in the process without departing from the spirit and scope of the invention as hereinafter set forth and claimed.

In the drawings:

Fig. 1 is a perspective view of a can of nuts packed according to the process of this invention and ready for shipment.

Fig. 2 is an elevation, partly broken away, of a can of nuts immediately after the can has been packed.

Fig. 3 is a view similar to Fig. 2 but several hours later, after a partial vacuum has been generated within the can.

To protect the shelled cashew nuts against spoilage they are packed with a protective or preservative gas, such as carbon dioxide, by any suitable apparatus, such as the apparatus disclosed in the above-mentioned patent.

In practicing this invention it has been found desirable to pack the nuts in containers having somewhat flexible walls, such as ordinary five gallon square metal cans, as indicated at 10 in Fig. 1. Before the can is sealed it is placed in a closed chamber and subjected to a vacuum to remove the air from the interior of the can, and thereafter carbon dioxide is admitted to the chamber and is permitted to fill the can. The can is then sealed, by soldering a cap 11 over the opening in the can. The carbon dioxide entrapped in the can tends to prevent spoilage, such as development of larvæ, bacteria, rancidity, etc.

This method of packing cashew nuts has a further important advantage in reducing to a minimum the breakage of the nuts. It is very important that the cashew nuts be delivered to the retailer in a whole condition, as broken nuts are depreciated approximately 25 cents per pound in value. In the ordinary method of shipping cashew nuts, about 10 to 25% of the nuts become broken, whereas by the improved packing method the breakage is considerably reduced.

The mechanical preservation of the nuts resulting from the use of the above-described process is apparently due to a slight vacuum created by partial solution of the carbon dioxide gas in the oil in the nuts. This vacuum pulls in the flexible sides of the can tightly against the nuts, so that they are held in a solid mass and cannot rattle about as they do when packed in the ordinary manner.

Fig. 2 shows the condition of the can and its contents immediately after it has been sealed. It will be noted that the sides of the can are flat and the nuts are relatively loose in the can. Fig. 3 shows the condition of the can and contents several hours after sealing. By this time part of the carbon dioxide has become dissolved in the oil in the nut, creating a partial vacuum in the can. This vacuum has drawn in the sides 12 and ends 13, so that they are now bowed inwardly, pressing the nuts into a compact mass. The solution of the gas takes place gradually, so that the nuts are not subjected to any sudden or harsh treatment, but are slowly and firmly pressed together.

When in this final bowed-in condition the sides and ends of the can are held in so strongly by the vacuum that the can and contents, weighing over 25 pounds, can be lifted by the handle 14 without moving the top end from its bowed-in position.

The use of a square can is particularly advantageous with this process, as the side walls are more easily bowed in than would be the case with a round can, and moreover with a square can the inward pressure is applied at the four sides of the can.

It has been found advantageous to employ an additional preliminary step in preparing the shelled nuts for packing.

After the nuts have been shelled the kernels must be dried before their skin is removed, as they must be very dry and brittle to be in condition for skinning. If packed immediately after skinning, which is the usual method, the nuts are so brittle that they break relatively easily.

The process of the present invention counteracts the dry and brittle condition of the cashew nuts by the addition of a suitable amount of moisture.

The moisture can be added by submitting the nuts to steam for a short time; by sprinkling them with water; or by exposing them for a sufficiently long time to air of comparatively high relative humidity. In practice we prefer to allow the nuts to obsorb the moisture from humid air, since this gives a more uniform moisture content and the water so taken up has more effect in producing a flexible condition in the nuts.

It has been found that nuts containing from 1 to 3% of water are quite brittle, while those containing from 3 to 4% are sufficiently brittle to break up to the amount of ten per cent even when well packed. If, however, the moisture is between 4½ to 5% the nuts are in perfect condition for packing. Where the moisture is from 5 to 6% the vacuum in the can causes the nuts to stick together, and while 6% is a safe content of moisture as far as preservation is concerned, the nuts are too rubbery to meet the demands of the trade. In excess of 6% we find that a sour fermentation takes place even in the presence of the carbon dioxide gas, with the result that the nuts become spotted when roasted. Moisture over these limits results in the growth of mold and bacteria.

In carrying out the process it is possible to use other inert preservative gases that are soluble in the oil in the nuts, for example a hydrocarbon gas, and the process is useful in packing other kinds of nuts, as pistachio nuts or blanched almonds. The term inert gas is used in its ordinary meaning in the art of food preservation.

I claim:

1. The process of packing shelled nuts in a flexible-walled container which comprises substantially filling the container with the nuts, exhausting air from the container, replacing the withdrawn air by an inert gas soluble in the oil contained in the nuts, and sealing the container, thereby causing the creation of a partial vacuum in the container to draw the flexible walls of the container against the nuts to prevent shifting of the nuts in transit.

2. An article of manufacture comprising a sealed flexible-walled container substantially filled with shelled nuts, and containing an inert gas part of which is in solution in the oil contained in the nuts, the walls of the container being contracted inwardly against the nuts by the partial vacuum caused by the dissolving of part of the inert gas in the oil contained in the nuts to substantially prevent shifting and breaking of the nuts during transport.

3. An article of manufacture comprising a sealed flexible-walled container substantially filled with shelled nuts, and containing carbon dioxide gas part of which is in solution in the oil contained in the nuts, the walls of the container being contracted inwardly against the nuts by the partial vacuum caused by the dissolving of part of the carbon dioxide in the oil contained in the nuts to substantially prevent shifting and breaking of the nuts during transport.

In testimony whereof I affix my signature.

THOMAS M. RECTOR.

DISCLAIMER 1,789,946.—*Thomas M. Rector*, Rutherford, N. J. METHOD OF PACKING NUTS. Patent dated January 20, 1931. Disclaimer filed April 16, 1931, by the assignee, *Franklin Baker Company*, patentee, said Rector assenting.

Hereby enters this disclaimer to the subject matter of each of the claims of said Letters Patent, except when the nuts are humidified so that their moisture content is approximately five per cent before they are sealed in the containers.

[*Official Gazette May 5, 1931.*]